(12) United States Patent
Otaguro

(10) Patent No.: US 7,466,093 B2
(45) Date of Patent: Dec. 16, 2008

(54) MOTOR DRIVE UNIT AND ELECTRIC APPARATUS HAVING A MOTOR

(75) Inventor: Yoshito Otaguro, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 238 days.

(21) Appl. No.: 10/597,640

(22) PCT Filed: Jan. 27, 2005

(86) PCT No.: PCT/JP2005/001535

§ 371 (c)(1),
(2), (4) Date: Aug. 2, 2006

(87) PCT Pub. No.: WO2005/083876

PCT Pub. Date: Sep. 9, 2005

(65) Prior Publication Data

US 2008/0218107 A1    Sep. 11, 2008

(30) Foreign Application Priority Data

Feb. 26, 2004 (JP) ............................. 2004-050863

(51) Int. Cl.
*H02P 1/00* (2006.01)
(52) U.S. Cl. ................. 318/400.09; 318/400.06; 318/400.11; 318/400.36; 318/400.26; 318/400.27
(58) Field of Classification Search ........... 318/400.26, 318/400.27, 400.36, 400.11, 400.09, 400.06
See application file for complete search history.

(56) References Cited

U.S. PATENT DOCUMENTS

| | | | | |
|---|---|---|---|---|
| 5,432,414 A | * | 7/1995 | Sakurai et al. | 318/400.21 |
| 5,608,300 A | * | 3/1997 | Kawabata et al. | 318/721 |
| 6,124,689 A | * | 9/2000 | Kardash | 318/400.2 |
| 6,243,635 B1 | * | 6/2001 | Swan et al. | 701/49 |

(Continued)

FOREIGN PATENT DOCUMENTS

JP    05-268791 A    10/1993

(Continued)

OTHER PUBLICATIONS

International Search Report issued in the corresponding International Application No. PCT/JP2005/001535, mailed on Apr. 12, 2005.

*Primary Examiner*—Rita Leykin
(74) *Attorney, Agent, or Firm*—Keating & Bennett, LLP

(57) ABSTRACT

A motor drive unit capable of detecting the position of a stationary rotor of any type of sensorless motor, determining a proper startup logic for the rotor, and starting up the motor in a stable condition. To do this, multiple stator coils of the sensorless motor are supplied with rotor-position detecting drive voltages that are adapted to vary the middle point voltage of the multiple stator coils but do not rotate the motor. The middle point voltage of the stator coils is compared with a detection reference voltage. When the result of the comparison matches one of predetermined detection logic patterns, a proper startup logic is generated in accordance with the position of the rotor specified by the matching detection logic pattern to start up the motor. Otherwise, the detection reference voltage is changed in level, and a new rotor-position detecting signal is generated to repeat the procedure for detecting the rotor position.

8 Claims, 12 Drawing Sheets

U.S. PATENT DOCUMENTS 6,479,956 B1 * 11/2002 Kawabata et al. ...... 318/400.12
6,946,808 B2 * 9/2005 Kandori ................. 318/400.33
7,102,312 B2 * 9/2006 Suzuki et al. .......... 318/400.05

FOREIGN PATENT DOCUMENTS

| JP | 07-177788 A | 7/1995 |
| JP | 2001-008490 A | 1/2001 |
| JP | 2004-104846 A | 4/2004 |
| JP | 2004-364473 A | 12/2004 |

* cited by examiner

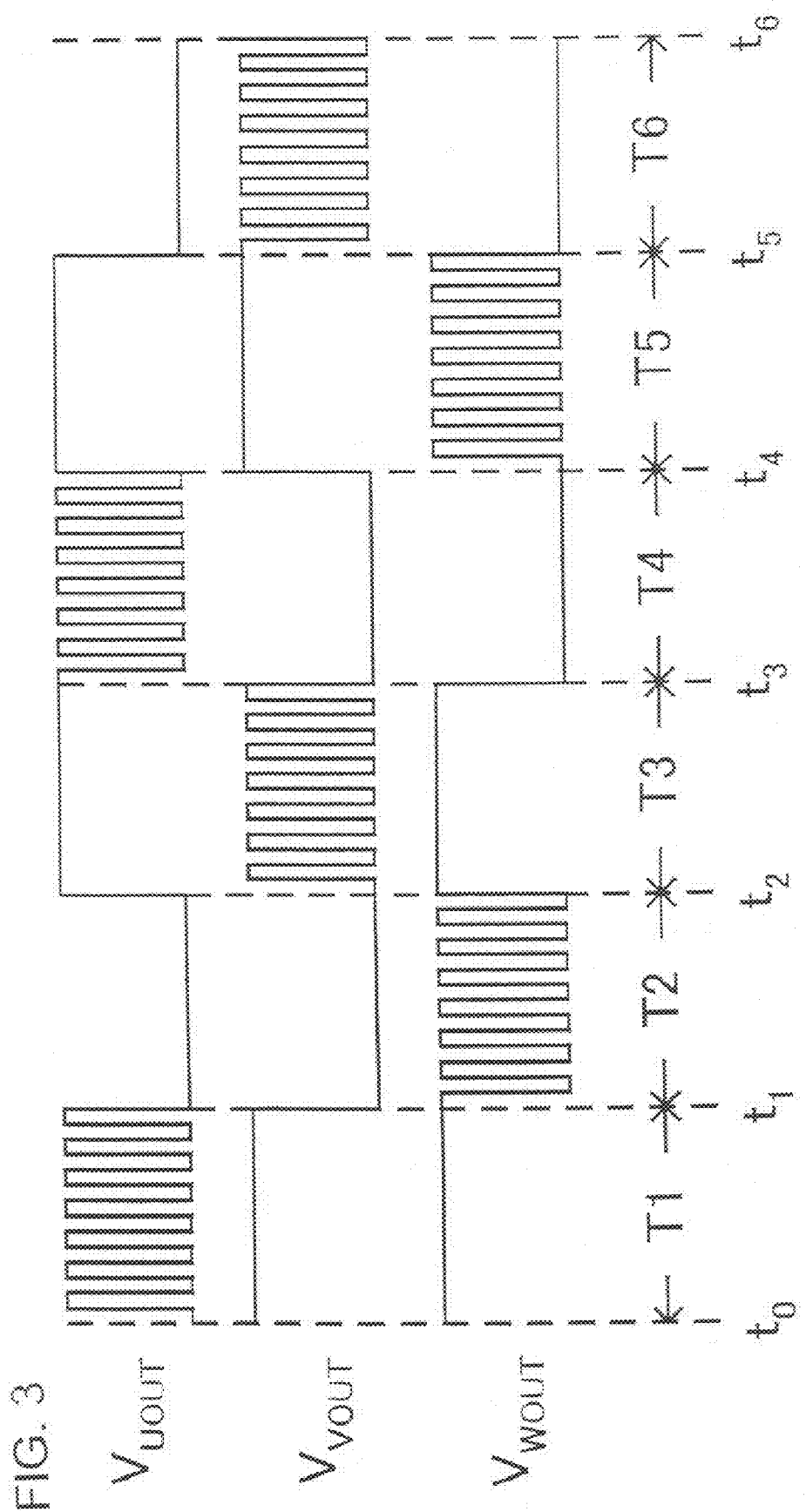

pos.1 pos.1 → pos.2

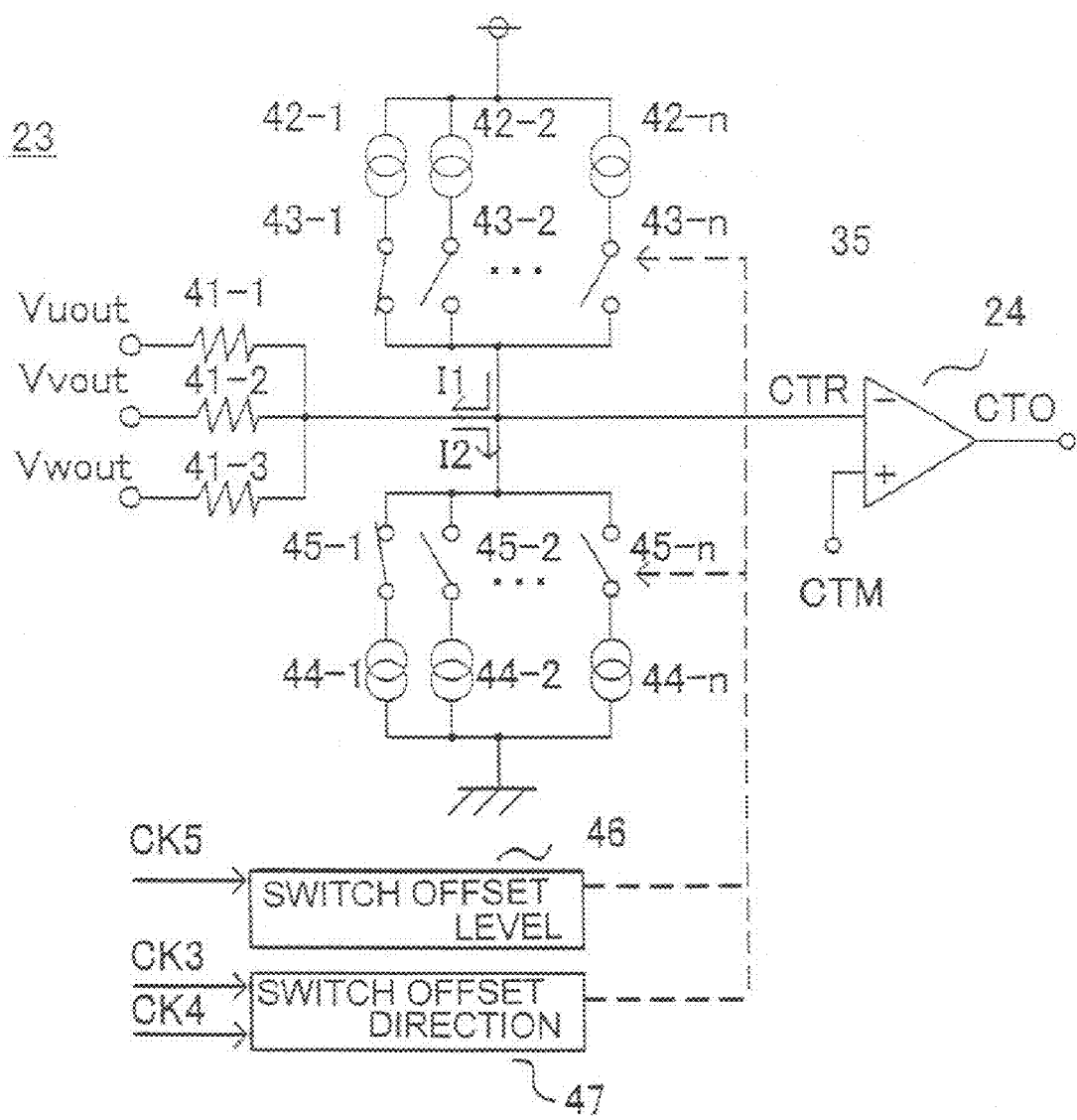

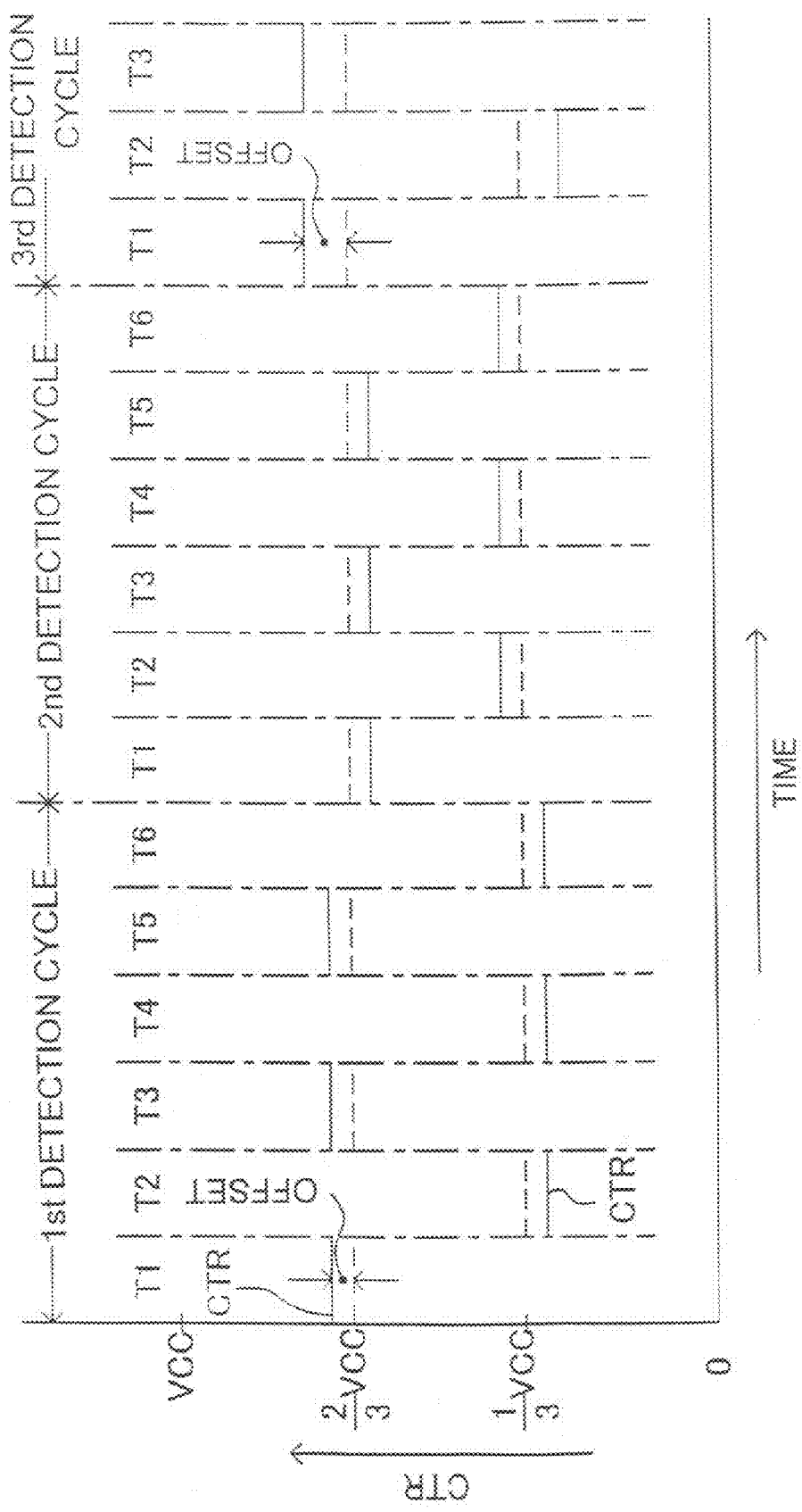

FIG. 8

DETECTION LOGIC PTN 1

| | 1 | 2 | 3 | 4 | 5 | 6 | Y1, Y2, Y3 |
|---|---|---|---|---|---|---|---|
| Pos. 1 | L | H | H | L | L | L | (H, L, M) |
| Pos. 2 | L | L | H | L | L | L | (H, M, L) |
| Pos. 3 | L | L | H | H | L | L | |
| Pos. 4 | L | L | L | H | L | L | (M, H, L) |
| Pos. 5 | L | L | L | H | H | L | |
| Pos. 6 | L | L | L | L | H | L | (L, H, M) |
| Pos. 7 | L | L | L | L | H | H | |
| Pos. 8 | L | L | L | L | L | H | (L, M, H) |
| Pos. 9 | H | L | L | L | L | H | |
| Pos. 10 | H | L | L | L | L | L | (M, L, H) |
| Pos. 11 | H | H | L | L | L | L | |
| Pos. 12 | L | H | L | L | L | L | (H, L, M) |

DETECTION LOGIC PTN 2

| | 1 | 2 | 3 | 4 | 5 | 6 | Y1, Y2, Y3 |
|---|---|---|---|---|---|---|---|
| Pos. 1 | L | H | H | L | L | L | (H, L, M) |
| Pos. 2 | L | H | H | H | L | L | (H, M, L) |
| Pos. 3 | L | L | H | H | L | L | |
| Pos. 4 | L | L | H | H | H | L | (M, H, L) |
| Pos. 5 | L | L | L | H | H | L | |
| Pos. 6 | L | L | L | H | H | H | (L, H, M) |
| Pos. 7 | L | L | L | L | H | H | |
| Pos. 8 | H | L | L | L | H | H | (L, M, H) |
| Pos. 9 | H | L | L | L | L | H | |
| Pos. 10 | H | H | L | L | L | H | (M, L, H) |
| Pos. 11 | H | H | L | L | L | L | |
| Pos. 12 | H | H | H | L | L | L | (H, L, M) |

DETECTION LOGIC PTN 3

| | 1 | 2 | 3 | 4 | 5 | 6 | Y1, Y2, Y3 |
|---|---|---|---|---|---|---|---|
| Pos. 1 | H | H | H | H | L | L | (H, L, M) |
| Pos. 2 | L | H | H | H | L | L | (H, M, L) |
| Pos. 3 | L | H | H | H | H | L | |
| Pos. 4 | L | L | H | H | H | L | (M, H, L) |
| Pos. 5 | L | L | H | H | H | H | |
| Pos. 6 | L | L | L | H | H | H | (L, H, M) |
| Pos. 7 | H | L | L | H | H | H | |
| Pos. 8 | H | L | L | L | H | H | (L, M, H) |
| Pos. 9 | H | H | L | L | H | H | |
| Pos. 10 | H | H | L | L | L | H | (M, L, H) |
| Pos. 11 | H | H | H | L | L | H | |
| Pos. 12 | H | H | H | L | L | L | (H, L, M) |

DETECTION LOGIC PTN 4

| | 1 | 2 | 3 | 4 | 5 | 6 | Y1, Y2, Y3 |
|---|---|---|---|---|---|---|---|
| Pos. 1 | H | H | H | H | L | L | (H, L, M) |
| Pos. 2 | H | H | H | H | H | L | (H, M, L) |
| Pos. 3 | L | H | H | H | H | L | |
| Pos. 4 | L | H | H | H | H | H | (M, H, L) |
| Pos. 5 | L | L | H | H | H | H | |
| Pos. 6 | H | L | H | H | H | H | (L, H, M) |
| Pos. 7 | H | L | L | H | H | H | |
| Pos. 8 | H | H | L | H | H | H | (L, M, H) |
| Pos. 9 | H | H | L | L | H | H | |
| Pos. 10 | H | H | H | L | H | H | (M, L, H) |
| Pos. 11 | H | H | H | L | L | H | |
| Pos. 12 | H | H | H | L | L | H | (H, L, M) |

FIG. 9

DETECTION LOGIC PTN 1

| | 1 | 2 | 3 | 4 | 5 | 6 | Y1, Y2, Y3 |
|---|---|---|---|---|---|---|---|
| Pos. 1 | H | H | L | L | H | L | (H, L, M) |
| Pos. 2 | H | L | L | L | H | L | (H, M, L) |
| Pos. 3 | H | L | L | H | H | L | |
| Pos. 4 | H | L | L | H | H | L | (M, H, L) |
| Pos. 5 | H | L | H | H | L | L | |
| Pos. 6 | H | L | H | L | L | L | (L, H, M) |
| Pos. 7 | H | L | H | L | L | H | |
| Pos. 8 | L | L | H | L | H | H | (L, M, H) |
| Pos. 9 | L | L | H | L | H | H | |
| Pos. 10 | L | L | H | L | H | L | (M, L, H) |
| Pos. 11 | L | H | H | L | H | L | |
| Pos. 12 | H | H | H | L | H | L | (H, L, M) |

DETECTION LOGIC PTN 2

| | 1 | 2 | 3 | 4 | 5 | 6 | Y1, Y2, Y3 |
|---|---|---|---|---|---|---|---|
| Pos. 1 | H | H | L | L | H | L | (H, L, M) |
| Pos. 2 | H | H | L | H | H | L | (H, M, L) |
| Pos. 3 | H | L | L | H | H | L | |
| Pos. 4 | H | L | L | H | L | L | (M, H, L) |
| Pos. 5 | H | L | H | H | L | L | |
| Pos. 6 | H | L | H | H | L | H | (L, H, M) |
| Pos. 7 | H | L | H | L | L | H | |
| Pos. 8 | L | L | H | L | L | H | (L, M, H) |
| Pos. 9 | L | L | H | L | H | H | |
| Pos. 10 | L | H | H | L | H | H | (M, L, H) |
| Pos. 11 | L | H | H | L | H | L | |
| Pos. 12 | L | H | L | L | H | L | (H, L, M) |

DETECTION LOGIC PTN 3

| | 1 | 2 | 3 | 4 | 5 | 6 | Y1, Y2, Y3 |
|---|---|---|---|---|---|---|---|
| Pos. 1 | L | H | L | H | H | L | (H, L, M) |
| Pos. 2 | H | H | L | H | H | L | (H, M, L) |
| Pos. 3 | H | H | L | H | L | L | |
| Pos. 4 | H | L | L | H | L | L | (M, H, L) |
| Pos. 5 | H | L | L | H | L | H | |
| Pos. 6 | H | L | H | H | L | H | (L, H, M) |
| Pos. 7 | L | L | H | H | L | H | |
| Pos. 8 | L | L | H | L | L | H | (L, M, H) |
| Pos. 9 | L | H | H | L | L | H | |
| Pos. 10 | L | H | H | L | L | H | (M, L, H) |
| Pos. 11 | L | H | L | L | L | H | |
| Pos. 12 | L | H | L | L | H | L | (H, L, M) |

DETECTION LOGIC PTN 4

| | 1 | 2 | 3 | 4 | 5 | 6 | Y1, Y2, Y3 |
|---|---|---|---|---|---|---|---|
| Pos. 1 | L | H | L | H | H | L | (H, L, M) |
| Pos. 2 | L | H | L | H | L | L | (H, M, L) |
| Pos. 3 | H | H | L | H | L | L | |
| Pos. 4 | H | H | L | H | L | H | (M, H, L) |
| Pos. 5 | H | L | L | H | L | H | |
| Pos. 6 | L | L | L | H | L | H | (L, H, M) |
| Pos. 7 | L | L | H | H | L | H | |
| Pos. 8 | L | H | H | L | L | H | (L, M, H) |
| Pos. 9 | L | H | H | L | L | H | |
| Pos. 10 | L | H | L | L | L | H | (M, L, H) |
| Pos. 11 | L | H | L | L | H | H | |
| Pos. 12 | L | H | L | L | H | H | (H, L, M) |

MOTOR DRIVE UNIT AND ELECTRIC APPARATUS HAVING A MOTOR

TECHNICAL FIELD

This invention relates to a drive unit for use with a motor having no rotational position sensor (hereinafter referred to as sensorless motor) and an electric apparatus having a sensorless motor driven by such drive unit.

BACKGROUND ART

Sensorless motors have been increasingly used in, for example, MD drives and HDD drives, because of their simplicity in structure having no rotational position sensor that utilizes, for example, a Hall element. However, sensorless motors have a problem in that they are not always started up in a predetermined direction due to the fact that the position of the magnetic rotor of a stationary motor is not known.

In a conventional method of starting up a sensorless motor, the motor is forcibly vibrated in a predetermined sequence that has nothing to do with the position of the rotor.

This startup method suffers a problem in that the motor is not always started in the normal (or forward) direction due to the fact that the motor is supplied with three-phase voltages generated on the basis of a startup logic that has nothing to do with the position of the rotor.

Japanese Patent Application Laid Open No. H5-268791 (hereinafter referred to as Patent Document 1) discloses a motor drive unit adapted to detect the position of a rotor by monitoring the zero crossover voltage in the stator coil thereof in a floating state. This method allows detection of the position of the rotor in the process of re-synchronizing the motor after it has lost synchronization. However, the method cannot detect the position of the rotor before the motor is started up, since the method can detect the position of the rotor only if the motor is in motion.

In view of these circumstances, the applicants of the present invention have proposed a motor drive unit capable of properly starting up a sensorless motor based on a predetermined startup logic in accordance with the rotational position of the rotor at rest. (See Japanese Patent Application Laid Open No. 2004-104846, which will be referred to as related reference.) This related reference is not in the public domain as of the priority date of this application.

The motor drive unit of the related reference is adapted to sequentially supply the stator coils of a sensorless motor with drive voltages (referred to as rotor-position detection drive voltages) that are insufficient to drive the motor at rest, and compares the middle point voltage of the stator coils with a given reference voltage to provide results of the comparison (referred to as detection pattern), from which the position of the rotor is detected. A proper startup logic is determined based on the position of the rotor.

In the motor drive unit of the related reference, middle point voltage is generated in a different condition from one motor to another (different in level and variation for example). Thus, in order to obtain predetermined detection patterns for different types of motors, the reference voltage must be adjusted for each motor used. Moreover, depending on the conditions of the stator coils generating the middle point voltage, an anticipated detection pattern cannot be obtained by adjusting only the reference voltage.

Further, when the power supply voltage applied to the motor has dropped below, or risen above, the rated voltage thereof, the middle point voltage of the stator coils gets changed according to the amount of drop or rise in the power supply voltage. Thus, under such condition, it is still more difficult to obtain a prescribed result by comparison (i.e., detection pattern).

It is therefore, an object of the present invention to provide a motor drive unit for use with a sensorless motor capable of unfailingly detecting the position of the stationary rotor and determine an appropriate startup logic therefor, irrespective of the type the sensorless motor, thereby capable of determining a proper startup logic and enabling the motor to start up in a stable manner. It is another object of the invention to provide an electronic apparatus equipped with a sensorless motor driven by the motor drive unit of the invention.

It is a further object of the present invention to provide a sensorless motor that can be started up in a stable manner even in the event of an excessive drop or rise in the power supply voltage supplied to the motor.

DISCLOSURE OF THE INVENTION

A motor drive unit for driving a sensorless motor in accordance with the present invention has a multiplicity of stator coils and a drive switching circuit for supplying drive current to the stator coils and is adapted to control the drive switching circuit by a drive signal, wherein the drive unit comprises:

a sequence circuit for providing said drive switching circuit with a rotor-position detection signal for controlling said drive switching circuit such that, prior to starting up said sensorless motor, said multiple stator coils are supplied with rotor-position detection drive voltages that vary the middle point voltage of the respective stator coils but will not rotate said sensorless motor; and a matching-pattern detection circuit adapted to compare the middle point voltage of said multiple stator coils obtained under said applied rotor-position detection drive voltages with the detection reference voltage established on the basis of said rotor-position detection drive voltages, and determine whether or not the result of said comparison matches any one of predetermined detection logic patterns, wherein when they do match in said comparison, said motor drive unit generates a startup logic in accord with the rotor position specified by the matching detection logic pattern, but when they do not match in said comparison, said motor drive unit varies the detection reference voltage and causes said sequence circuit to generate a further rotor-position detecting signal to repeat detection of said rotor position.

The rotor position detecting voltages may be generated so as to create in sequence two states such that, in one state, a stator coil of one arbitrary phase is switched on and off to have a low potential when it is switched on while other stator coils of other phases have a high potential, and, in another state, a stator coil of another arbitrary phase is switched on and off to have a high potential when it is switched on while other stator coils of other phases have a low potential, said sequence repeated allowing one arbitrary phase shifting from one stator coil to another.

The predetermined detection logic patterns may multiply include different detection logic patterns for a given rotor position.

The matching-pattern detection circuit may have a detection-level generation circuit for adding to a variable offset voltage a virtually neutral point voltage that is formed based on the rotor-position detection drive voltages supplied to said multiple stator coils, to thereby obtain said detection reference voltage.

The virtually neutral point voltage is formed by a resistor circuit consisting of a multiplicity of resistors each having one end coupled to the rotor position detection drive voltage the other end connected to a common node.

The offset voltage can be switched in level and/or polarity by an offset switching signal.

The matching-pattern detection circuit may include:

a comparator for comparing said middle point voltage with said detection reference voltage;

a register for storing as a detected pattern the results of said comparison (comparison outputs) received in sequence from said comparator; and a decoder for comparing said detection pattern stored in said register with said predetermined detection logic patterns and for outputting said startup logic along with a mode selection signal instructing either detecting the position of said rotor or driving of said motor in accordance with the result of the comparison.

An electric apparatus of the invention comprises a sensorless motor and a motor drive unit for driving the sensorless motor as described above.

According to the invention, in an electronic apparatus equipped with a sensorless motor and an inventive sensorless motor drive unit therefor, stator coils of the motor are supplied with rotor-position detection drive voltages for varying the middle point voltage of the stator coils without rotating the motor. The middle point voltage of the stator coils is compared with a detection reference voltage. If a result of comparison, i.e. a detection pattern obtained in the comparison, matches any one member of a group of predetermined detection logic patterns, a startup logic is generated in accordance with the position of the rotor that is specified by that detection logic pattern. Otherwise, the level of the detection reference voltage is changed to generate a new rotor-position detection signal to repeat detection of the rotor position. In this way, irrespective of the type of the sensorless motor used, the motor can be unfailingly started up in a stable manner without adjusting the level of the detection reference voltage for the motor. This can be done by detecting the stationary position of the rotor and by determining a proper startup logic for the rotor. The motor can be started up in a stable condition even when the power supply voltage to the motor has exceedingly dropped or risen since the position of the rotor can be unfailingly determined under such conditions.

It is noted that the rotor position detection voltages are generated so as to create in sequence two states such that, in one state, a stator coil of one arbitrary phase is switched on and off to have a low potential when it is switched on while other stator coils of other phases have a high potential, and, in another state, a stator coil of another arbitrary phase is switched on and off to have a high potential when it is switched on while other stator coils of other phases have a low potential, said sequence repeated allowing one arbitrary phase shifting from one stator coil to another, thereby enabling unfailing and efficient detection of the rotor position of a sensorless motor.

BRIEF DESCRIPTION OF DRAWINGS

FIG. 3 is a diagram showing waveforms of rotor-position detection drive voltages.

FIG. 6B shows another specific arrangement of the detection-level generation circuit.

FIG. 7 shows a modification of detection reference voltage CTR.

FIG. 8 shows a group of detection logic patterns in comprehensive forms.

FIG. 9 shows actual detection logic patterns of the detection logic patterns in comprehensive forms.

BEST MODE FOR CARRYING OUT THE INVENTION

Figure 1:
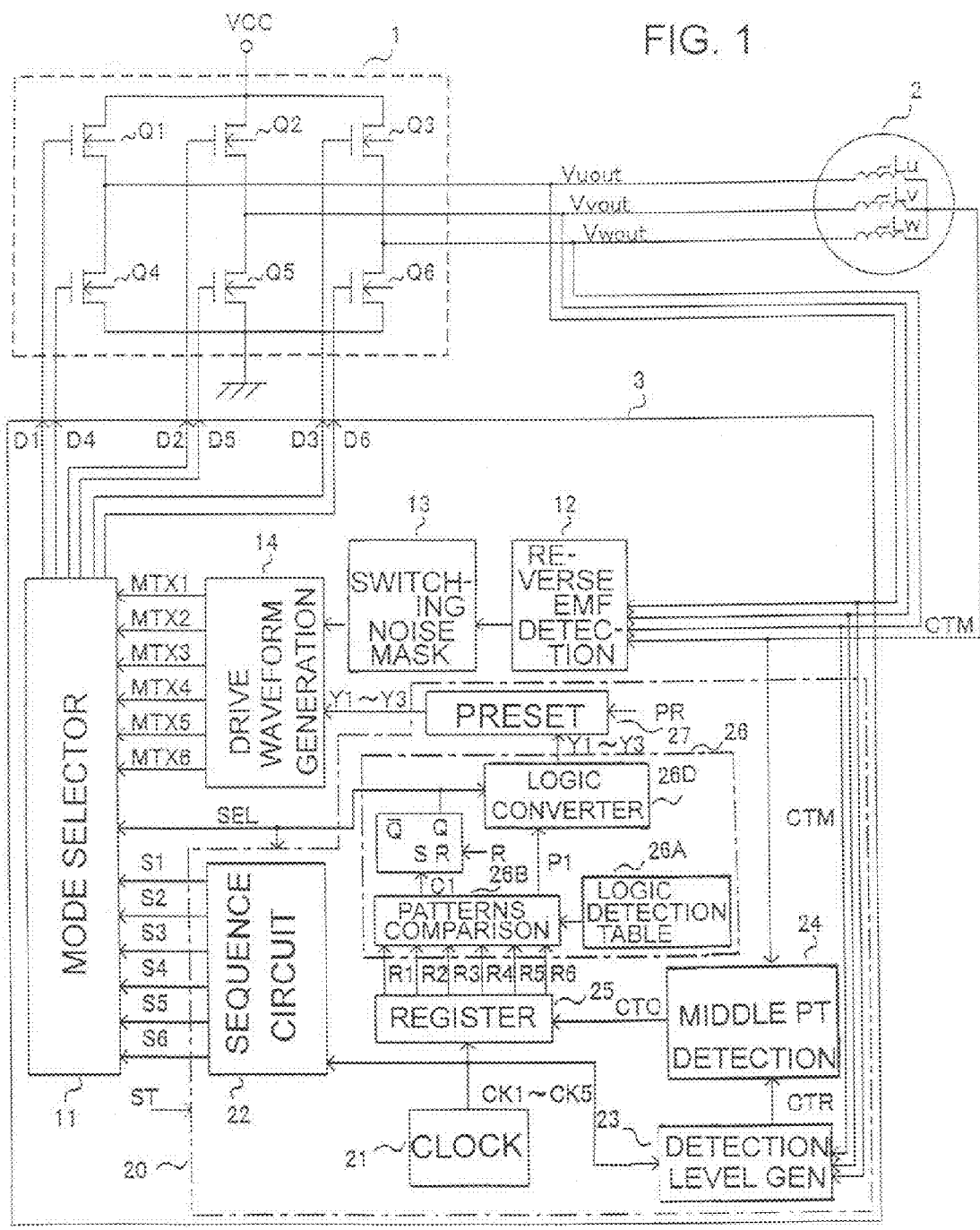
FIG. 1 is a figure showing an overall arrangement of a motor drive unit of the invention.

Referring to the accompanying drawings, an inventive drive unit for a senseless motor and an electric apparatus utilizing a senseless motor driven by the inventive drive unit will now be described. FIG. 1 shows an overall arrangement of a motor drive unit for use with a three-phase sensorless motor. It should be understood, however, that the invention is applicable to poly-phase motors other than three-phase motors.

As seen in FIG. 1, the driver section (i.e., drive switch circuit) 1 of the drive unit is a three-phase drive circuit consisting of power transistors Q1-Q6 each in the form of an n-channel type MOSFET. The drains of the power transistors Q1-Q3 are connected together to a terminal that is coupled to a drive voltage (power supply voltage) VCC. The source of the power transistor Q1 is connected to the drain of the power transistor Q4, the source of the power transistor Q3 connected to the drain of the power transistor Q5, and the source of the power transistor Q3 connected to the drain of the power transistor Q6. The sources of the power transistors Q4-Q6 are connected to the ground. It should be understood that the power transistors Q1-Q6 can be p-channel type MOSFETs, or the power transistors Q1-Q3 can be p-channel type MOSFETs with the power transistors Q4-Q6 being n-channel type MOSFETs.

One end of a stator coil Lu of a sensorless motor 2 is connected to the node of the power transistors Q1 and Q4. One end of a stator coil Lv is connected to the node of the power transistors Q2 and Q5, and one end of a stator coil Lw is connected to the node of the power transistors Q3 and Q6. Opposite ends of the stator coils Lu, Lv, and Lw are connected together in star connection.

A motor drive control circuit 3 is connected to the respective nodes of the motor 2 and the drive switch circuit 1, and to the common node (referred to as middle point) of the opposite ends of the stator coils Lu, Lv, and Lw. The motor drive control circuit 3 has output terminals for outputting its drive signals D1-D6 to the respective gates of the power transistors Q1-Q6.

Thus, the drive switch circuit 1 is controlled by the drive signals D1-D6 outputted from the motor drive control circuit 3. As a consequence, drive voltages are supplied from the drive switch circuit 1 to the motor 2 to provide drive currents for rotating the motor 2.

Next, a motor drive control circuit 3 will be described. The motor drive control circuit 3 consists of a mode selection circuit 11, a back electromotive force (back EMF) detection circuit 12, a switching-noise masking circuit 13, a drive-waveform generation circuit 14, and a rotor-position detection circuit 20 for detecting the position of a stationary magnet rotor and for generating a startup logic.

The back EMF detection circuit 12, switching-noise masking circuit 13, and drive-waveform generation circuit 14 are provided to cause the motor 2 to maintain steady rotation subsequent to a startup. During a rotational motion subsequent to a startup, the back EMF detection circuit 12 detects back EMFs generated in the stator coils (which are in floating conditions) based on the motor drive voltages Vuout, Vvout, and Vwout generated in the respective stator coils and the voltage CTM at the middle point (referred to as middle point voltage CTM) and outputs a detection signal indicative of the back EMFs (the detection signal hereinafter referred to as back EMF detection signal) to the switching-noise masking circuit 13. The switching-noise masking circuit 13 outputs the back EMF detection signal to the drive-waveform generation circuit 14 after removing therefrom switching noises generated by the power transistors Q1-Q6. The drive-waveform generation circuit 14 detects the position of the rotor in rotation from the back EMF detection signal, and generates drive signals MTX1-MTX6 in accordance with the position of the rotor. Since the mode selection circuit 11 is switched to an operational mode after a startup, drive signals MTX1-MTX6 are outputted to the drive section 1 as drive signals D1-D6 via the mode selection circuit 11.

In order to start up and put the motor 2 at rest in an operating state, it is necessary to determine the current position of the stationary rotor and provide the drive-waveform generation circuit 14 with a startup logic in accord with that position of the rotor. This startup logic is generated by the rotor-position detection circuit 20.

The rotor-position detection circuit 20 includes:

a clock generation circuit 21 for generating different clocks needed by different components of the drive unit to control the drive unit;

a sequence circuit 22 for generating rotor-position detection signals S1-S6;

a detection-level generation circuit 23 for generating a variable detection reference voltage CTR;

a coil middle point variation detection comparator 24 adapted to compare the middle point voltage CTM of the stator coils with the detection reference voltage CTR to output a resultant comparison output CTO, i.e. a detection pattern;

a register 25 adapted to sequentially receive and store the comparison outputs CTO as a detection pattern R1-R6 in synchronism with rotor-position detection signals S1-S6;

a decoder 26 adapted to compare the detection pattern R1-R6 stored in, and outputted from, the register 25 with predetermined detection logic patterns, and generate a startup logic Y1-Y3 in accord with the rotor position specified by the matching detection logic pattern if the comparison result matches one of the detection logic patterns, or output a mode selection signal SEL to repeat detection of the rotor position by generating rotor-position detection signals S1-S6 from the sequence circuit 22 and changing the detection reference voltage CTR if none of the comparison result matches any of the detection logic patterns; and a presetting circuit 27.

This rotor-position detection circuit 20, excluding therefrom the sequence circuit 22, functions as a matching-pattern detection circuit.

The decoder 26 includes:

a logic detection table 26A that contains a group of predetermined detection logic patterns in such a way that the table multiply includes different logic patterns for a given rotor position;

a detection pattern comparison circuit 26B adapted to compare the detection pattern R1-R6 supplied from the register 25 with members of the group of the detection logic patterns to determine if there is a match between them, and, if there is a match, output a pattern matching signal C1 indicative of the match and the matching detection logic pattern P1;

a flip-flop (FF) circuit 26C that can be set by the pattern matching signal C1 and reset by a reset signal R; and a logic conversion circuit 26D for outputting the startup logic Y1-Y3 that is in accord with the matching detection logic pattern P1 when a setting output Q (mode select signal SEL) is outputted from the FF circuit 26C.

As a motor startup instruction signal ST is supplied from a control circuit (not shown) to the rotor-position detection circuit 20, the clock generating circuit 21 generates a first pulsed clock CK1 (of 50 kHz for example) having a short period, and a second through a fifth clocks by frequency-dividing the first clock CK1. These clocks are supplied to relevant components. As shown in the timing diagram of FIG. 2, of the second through fifth clocks, the second clock CK2 is a signal determining the timing of registering a comparison output CTO in the register 25 (henceforth the second clock will be also referred to as register instruction signal). The third clock CK3 is a timing signal for switching the durations of the rotor-position detection signals S1-S6. The fourth clock CK4 is a detection cycle signal for selecting either one of two detection cycles according to the level of the clock CK4 being high (H) level or low (L). The fifth clock CK5 is a detection level switching signal, which is outputted at every two detection cycles.

The sequence circuit 22 operates during each period for which rotor position detection signals S1-S6 are selected by the mode select signal SEL. The rotor-position detection signals S1-S6 change their states with reference to the timing of the fifth clock CK5 and at the timing of every third clock CK3.

Figure 2:
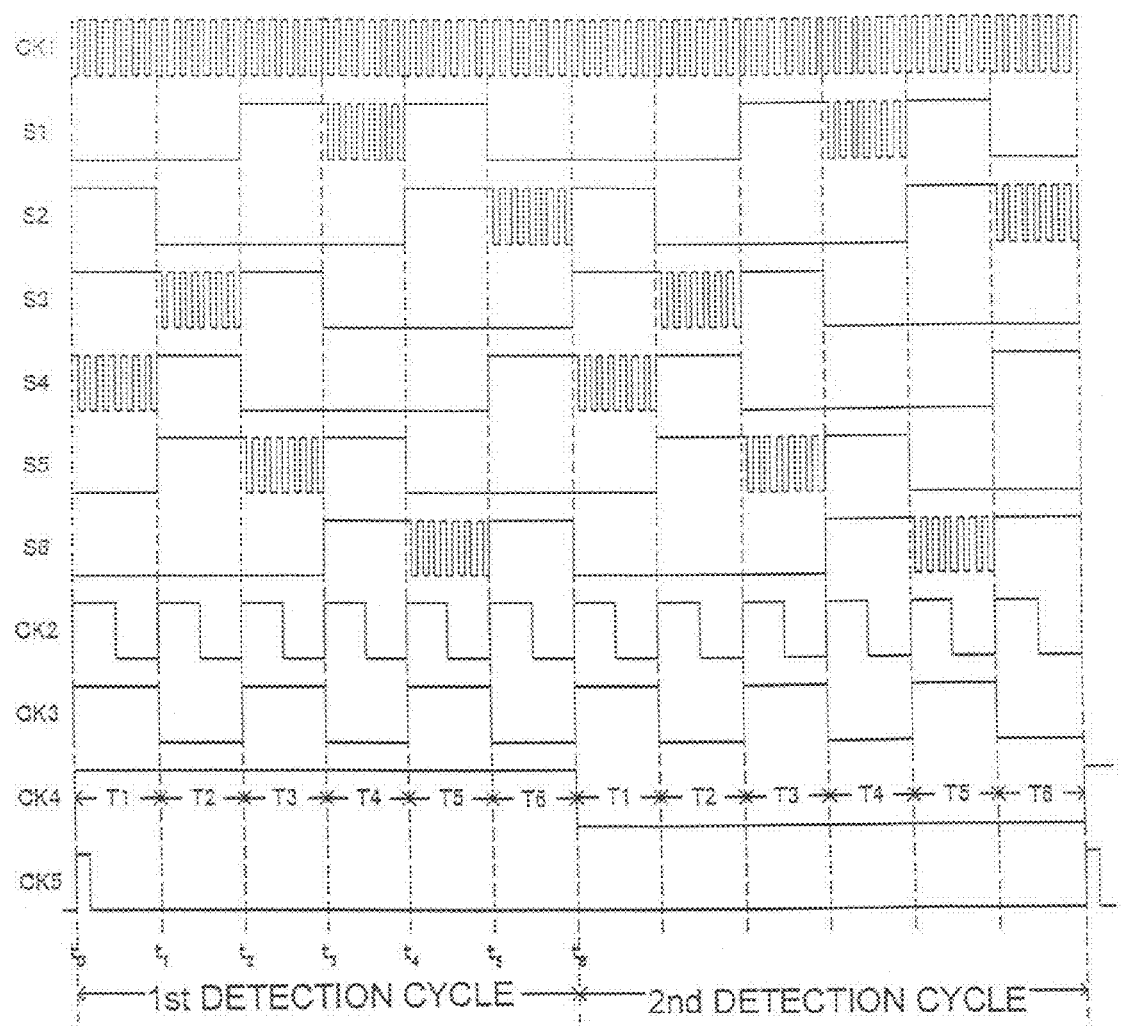
FIG. 2 is a timing diagram illustrating operation of the drive unit of FIG. 1.

Each of the rotor-position detection signals S1-S6 is provided only for a short period, not causing the motor 2 to start its rotational motion. As shown in FIG. 2, each of periods T1-T6, or time intervals t0-t1, t1-t2, . . . , t5-t6, lasts 600 microseconds for example. These intervals include high (H) level intervals, low (L) level intervals, and intervals of pulses having the same waveform as the clock CK1. Take the rotor-position detection signal S1 for example. The signal S1 has L level in periods T1 and T2; H level in period T3; pulses in period T4; H level in period T5; and L level in period T6. The sequential order of the rotor-position detection signals S1-S6 is determined according to the preference how to generate the rotor-position detection drive voltages Vuout, Vvout, and Vwout.

During a period of detecting the rotor position, the mode selection circuit 11 selectively outputs the rotor-position detection signals S1-S6 to the drive section 1 to control on-off operation of the power transistors Q1-Q6. As a specific example, in period T1, the power transistors Q1, Q5, and Q6 are switched off; power transistors Q2 and Q3 are switched on; and power transistor Q4 is switched on and off in synchronism with the clock CK1. In period T2, the power transistor Q1, Q2, and Q6 are switched off; power transistors Q4 and Q5 are switched on; and power transistor Q3 is switched on and off in synchronism with the clock CK1. In period T3, the power transistors Q2, Q4, and Q6 are switched off; power transistors Q1 and Q3 are switched on; and power transistor Q5 is switched on and off in synchronism with the clock CK1. In period T4, the power transistors Q2, Q3, and Q4 are switched off; power transistors Q5 and Q6 are switched on; and power transistor Q1 is switched on and off in synchronism with the clock CK1. In period T5, the power transistors Q3, Q4, and Q5 are switched off; power transistors Q1 and Q2 are switched on; and power transistor Q6 is switched on and off in synchronism with the clock CK1. In period T6, the power transistors Q1, Q3, and Q5 are switched off; power transistors Q4 and Q6 are switched on; and power transistor Q2 is switched on and off in synchronism with the clock CK1.

Thus, as shown in FIG. 3, the rotor-position detection drive voltages Vuout, Vvout, and Vwout applied to the respective stator coils Lu, Lv, and Lw respectively have L*, H, and H levels in period T1; L, L, H* levels in period T2; H, L*, and H levels in period T3; H*, L, and L levels in period T4; H, H, and L* levels in period T5; and L, H*, and L levels in period T6, where H* represents H level of a coil realized when an associated switch is switched on, and L* represents L level of a coil realized when an associated switch is switched on. Accordingly, pulsed current having the same short period of cycle as the first clock CK1 flows through each of the stator coils Lu, Lv, and Lw. Periods T1-T6 constitute one detection cycle. It is noted that the current passed through each of the stator coils Lu, Lv, and Lw are pulsed with a short period of cycle to make large their impedances, and hence the variation of the middle point voltage CTM.

The impedance of each stator coil is changed by the magnetic field formed by the magnets of the magnet rotor of the sensorless motor 2. Therefore, the middle point voltage CTM of the stator coils changes with the position of the stationary rotor when, for example, the voltages at the respective one ends of the stator coils are varied over periods T1-T6 as shown in FIG. 3. Thus, the position of the stationary rotor can be determined by monitoring the change in the middle point voltage CTM.

The comparator 24 compares the change in the middle point voltage CTM with the detection reference voltage CTR outputted from the detection-level generation circuit 23 to provide the result of the comparison (comparison output) CTO. A detection pattern is obtained from the comparison output CTO in each detection cycle over periods T1-T6.

Figure 4A:
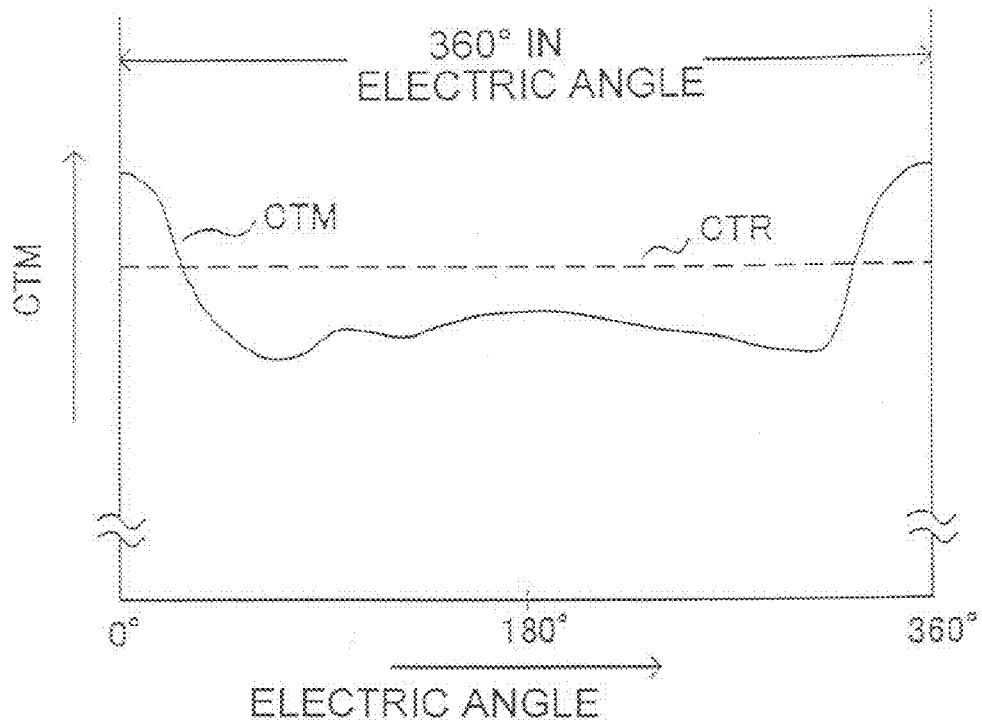
FIG. 4A illustrate a relationship between the middle point voltage of stator coils and the rotational position of a rotor.
Figure 4B:
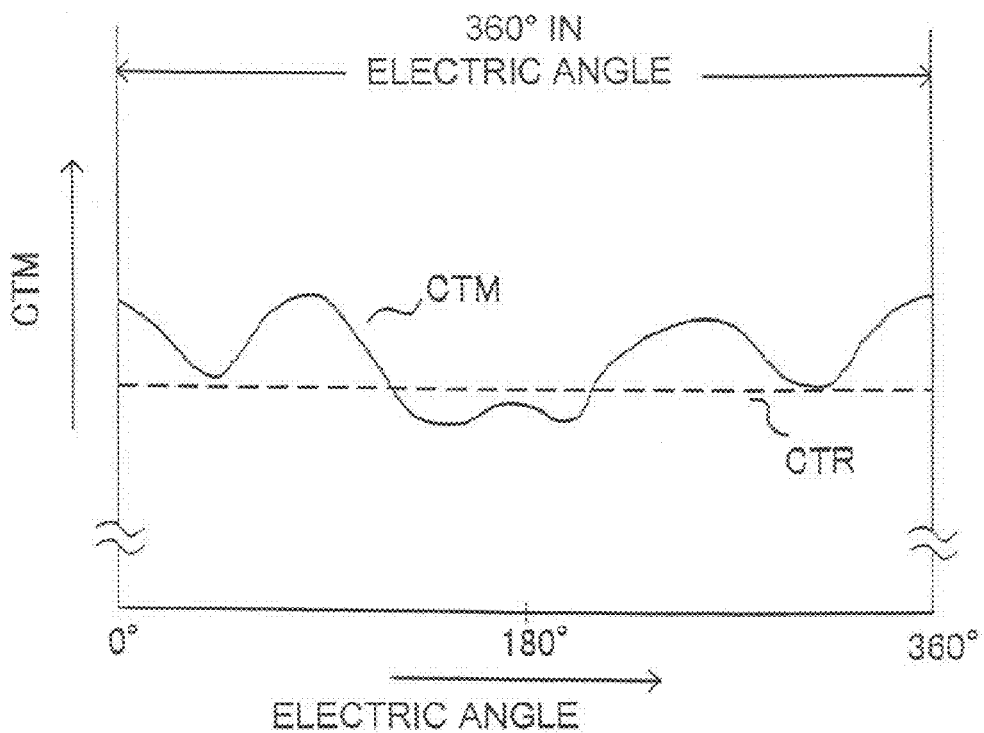
FIG. 4B illustrates another relationship between the middle point voltage of stator coils and the rotational position of a rotor.

It is noted that the middle point voltage CTM of a sensorless motor differ in magnitude from one motor to another if the motors have the same structure. FIGS. 4A and 4B are graphs showing how the middle point voltage CTM changes with the position of the rotor. FIGS. 4A and 4B illustrate variations of middle point voltage CTM when the rotational position of the magnet rotor, i.e. the electric angle thereof, of a motor is manually varied through an angle from 0 to 360 degrees while keeping two stator coils of other phases at H level and switching on and off one stator coil of one phase to have L level when it is switched on. Alternatively, one stator coil of one phase may be switched on and off to have H level while keeping two stator coils of other phases at L level.

As seen in the example shown above, the magnitude and pattern of the variation in the middle point voltage CTM differ from one motor to another, depending on, for example, the inductances and resistances of the stator coils, strength of the magnetic field formed thereby, and the distance (gap) between the rotor and the stator.

In the motor drive unit of the related reference, the level of the detection reference voltage CTR is adjusted for each type of the motor used so that a predetermined detection patterns can be obtained from the comparison outputs CTO in a detection cycles.

However, there are many (more than ten) kinds of sensorless motors adopted in MD drives or HDD drives. Therefore, adjustment of the level of the detection reference voltage CTR is required for each motor used.

Furthermore, the rotor position can be detected using just one kind of detection logic pattern as shown in the related reference by adjusting the level of the detection reference voltage CTR if the maximum level (peak point) of the middle point voltage CTM is distinct from other levels as shown in FIG. 4A. However, in the case of a motor exhibiting a pattern of variations in the middle point voltage CTR as shown in FIG. 4B, it is difficult to detect the rotor position accurately using just one kind of detection logic pattern as shown in the related reference solely by adjusting the detection reference voltage CTR.

The present invention, therefore, prepares a group of predetermined detection logic patterns that multiply include different logic patterns for a given rotor position, and repeats rotor position detection by varying the detection reference voltage CTR when the detected pattern obtained does not match any of the predetermined detection logic patterns of the group. Thus, irrespective of the type of the motor used, the position of the stationary rotor can be detected unfailingly and automatically without adjusting the detection reference voltage for that motor. To do this, the invention provides the motor drive unit with the detection-level generation circuit 23 and decoder 26.

It will be recalled that FIGS. 4A and 4B illustrate variations of the middle point voltage CTM when the position of the magnet rotor, or electric angle thereof, is manually varied through an angle from 0 to 360 degrees while keeping two stator coils of two phases at H level and switching on and off one stator coil of another phase to have L level when it is switched on. In actuality, however, instead of rotating the magnet rotor, the rotor-position detection signals S1-S6 are generated as shown in FIG. 2. The rotor-position detection signals S1-S6 generate the rotor-position detection drive voltages Vuout, Vvout, and Vwout as shown in FIG. 3. Exemplary comparison outputs CTO are shown in FIGS. 5A-5D.

Figure 5A:
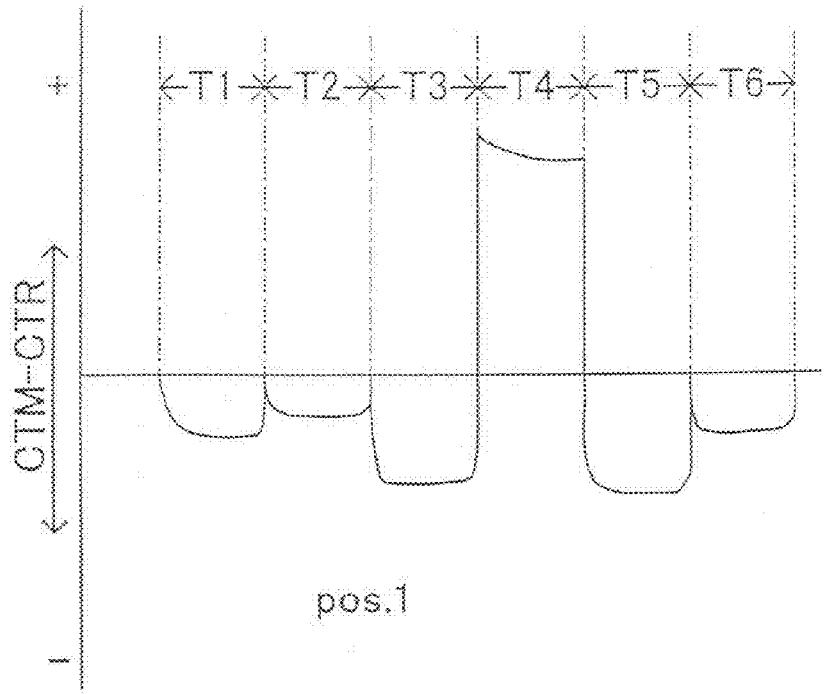
FIG. 5A shows a first exemplary pattern of comparison output obtained when rotor-position detection drive voltages are applied.
Figure 5B:
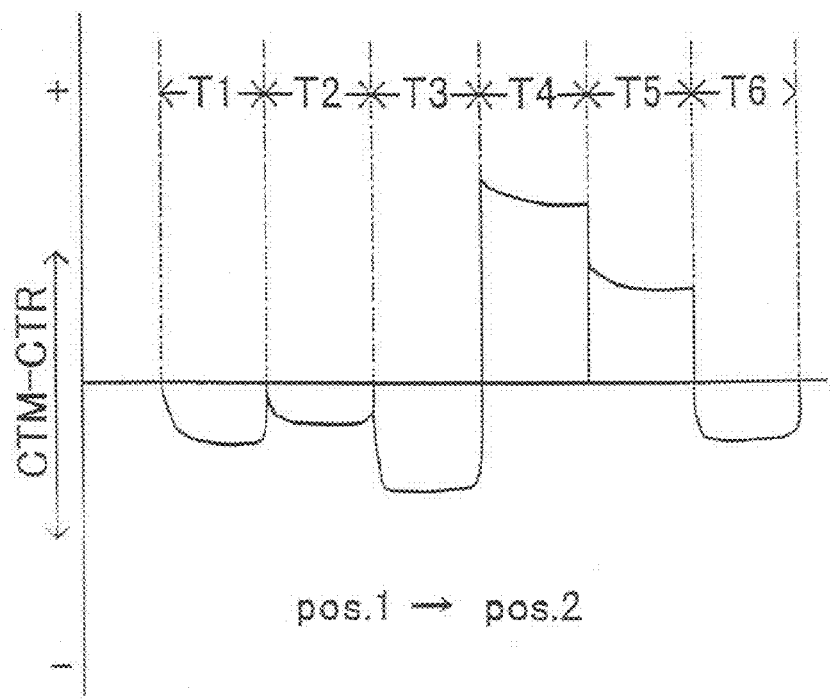
FIG. 5B shows a second exemplary pattern of comparison output obtained when rotor-position detection drive voltages are applied.
Figure 5C:
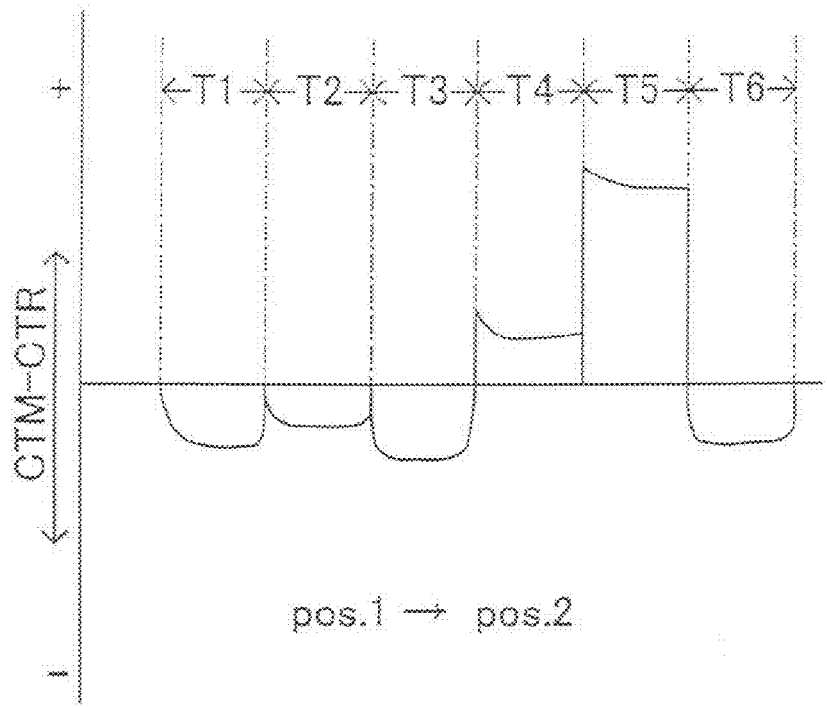
FIG. 5C showing a third exemplary pattern of comparison output obtained when rotor-position detection drive voltages are applied.
Figure 5D:
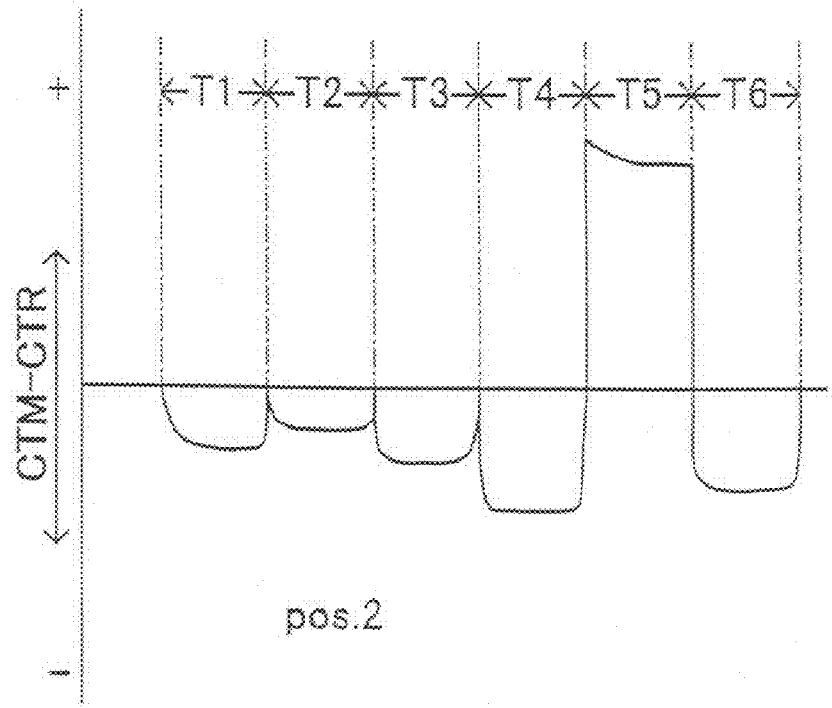
FIG. 5D shows a fourth exemplary pattern of comparison output obtained when rotor-position detection drive voltages are applied.

In the example shown, FIG. 5A shows a detection pattern over the periods T1-T6 in terms of the difference CTM-CTR between the middle point voltage CTM associated with an electric angle (of 0 degree for example) and the detection reference voltage CTR. The detection pattern of FIG. 5A is "LLLHLL". This detection pattern changes to "LLLHHL" of FIG. 5B as the electric angle changes by 60 degrees, and so does detection pattern "LLLHHL" of FIG. 5C to "LLLLHL" of FIG. 5D. Thus, the position of the rotor can be determined by detecting detection patterns varying over the range of electric angle from 0 to 360 degrees.

Figure 6A:
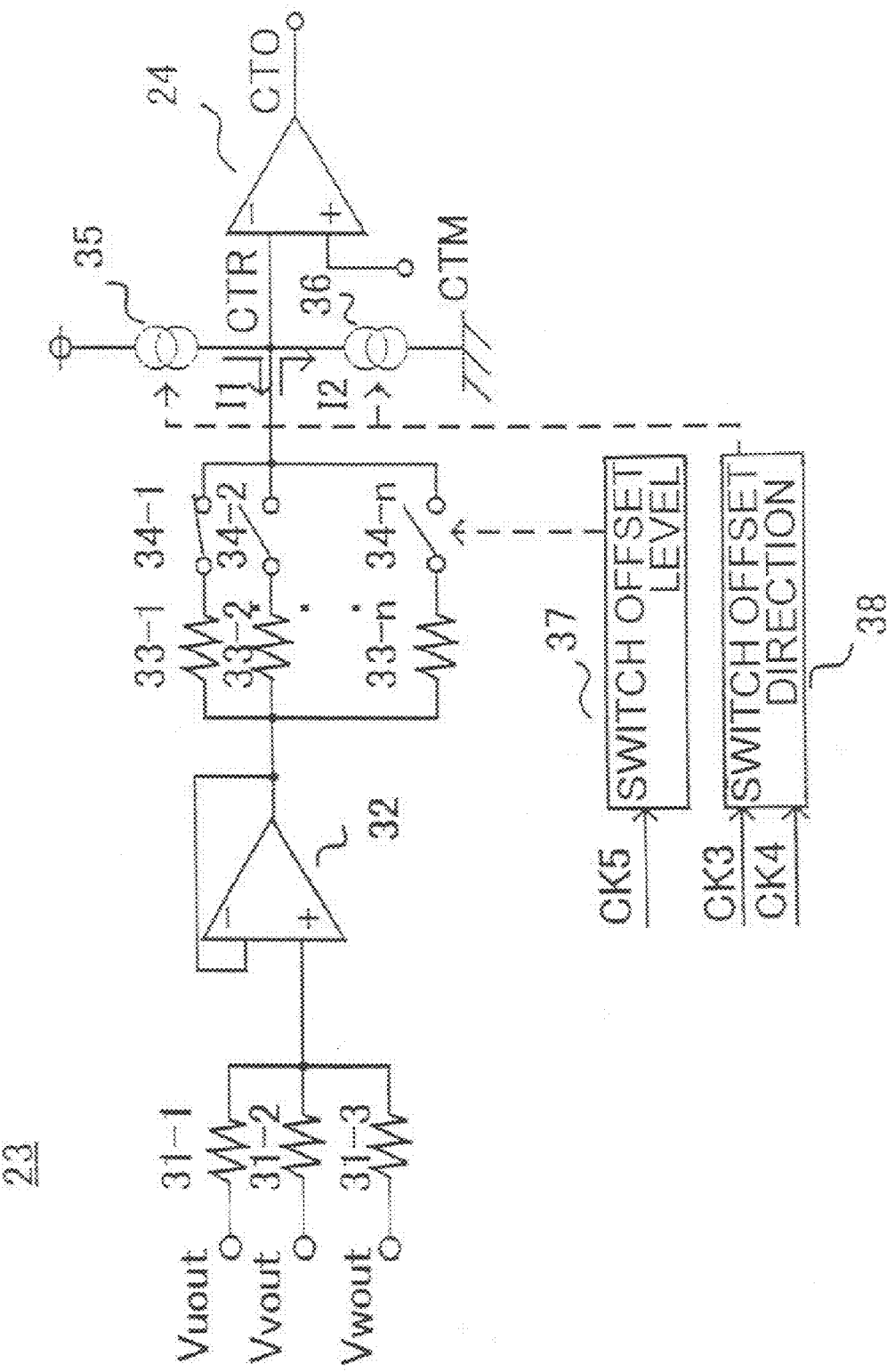
FIG. 6A shows a specific arrangement of a detection-level generation circuit.

Referring to FIGS. 6A and 6B, there are shown exemplary arrangements of the detection-level generation circuit 23. First, the arrangement of FIG. 6A will be described.

As shown in FIG. 6A, the drive voltage Vuout is supplied to one end of a resistor 31-1, the drive voltage Vvout to one end of a resistor 31-2, and the drive voltage Vwout to one end of a resistor 31-3. The opposite ends of the resistors 31-1-31-3 are connected together, and further connected to the inverting input terminal of a differential amplifier 32. A virtual neutral point voltage is generated at the opposite ends of the resistors 31-1 to 31-3. The output terminal and the inverting input terminal of the differential amplifier 32 are directly connected together to allow the amplifier to operate as a voltage follower. The output terminal of the differential amplifier 32 is connected to the inverting input terminal of the comparator 24 via either one of a first series circuit of resistor 33-1 and a switch 34-1 through an nth series circuit of a resistor 33-n and a switch 34-n. The voltage inputted to the inverting input terminal serves as the detection reference voltage CTR. Constant current I1 flows from a constant voltage terminal of the drive unit to the inverting input terminal of the comparator 24 via a constant current source 35, and constant current I2 flows from the inverting input terminal of the comparator 24 to the ground via a constant current source 36. The inverting input terminal of the comparator 24 is fed with the middle point voltage CTM. An offset voltage regulation circuit is formed to include these resistors 33-1-33-n, switches 34-1-34-n, constant current sources 35 and 36, an offset level switching circuit 37 and an offset direction switching circuit 38.

The switches 34-1-34-n are selectively switched over by a switching signal received from the offset level switching circuit 37. The current sources 35 and 36 are switched over by another switching signal received from the offset direction switching circuit 38. The magnitudes of the constant currents I1 and I2 can be equal or different. The current sources 35 and 36 can be simultaneously switched off so as not to give an offset voltage.

By switching the current sources 35 and 36 and switches 34-1-34-n, the level and direction of the offset voltage that is added to or subtracted from the virtual neutral point voltage (or the output voltage of the differential amplifier 32 operating as a voltage follower) generated at the opposite ends of the resistors 31-1-31-3 is changed, and so is the detection reference voltage CTR.

In the example shown in FIG. 6B, the drive voltage Vuout is inputted to one end of a resistor 41-1, the drive voltage Vvout to one end of a resistor 41-2, and the drive voltage Vwout to one end of a resistor 41-3. A virtual neutral point voltage is generated at the opposite ends of the resistors 41-1 to 41-3. The opposite ends of the resistors 41-1-41-3 are connected together and further to the inverting input terminal of the comparator 24. Current I1 flows from the constant voltage terminal into the opposite ends of the resistors 41-1-41-3 via either one series circuit selected from a first series circuit of a constant current source 42-1 and a constant voltage source 43-1 through an nth series circuit of a constant current source 42-n and a switch 43-n. Current I2 flows from the opposite ends of the resistors 41-1-41-3 connected together to the ground via either one series circuit selected from a first series circuit of a constant current source 44-1 and a switch 45-1 through an nth series circuit of a constant current source 44-n and a switch 45-n. The voltage inputted into the inverting input terminal serves as the detection reference voltage CTR. The middle point voltage CTM is inputted to the inverting input terminal of the comparator 24. An offset voltage regulation circuit is formed to include these constant current sources 42-1-42-n, switches 43-1-43-n, switches 45-1-45-n, and constant current sources 44-1-44-n, along with an offset level switching circuit 46 and an offset direction switching circuit 47.

The switches 43-1-43-n and 45-1-45-n are selectively switched on and off by a switching signal received from the offset level switching circuit 46 and a switching signal received from the offset direction switching circuit 47, respectively. By switching the switches 43-1-43-n and 45-1-45-n, the magnitudes and directions of the currents I1 and I2 can be altered, and so is the detection reference voltage CTR generated at the opposite ends of the resistors 41-1-41-3. The magnitudes of the currents I1 and I2 can be equal or different. Moreover, the switches 43-1-43-n and 45-1-45-n can be simultaneously switched off so that an offset voltage will not be given.

Referring to FIG. 7, there is shown a modification in which the level of the detection reference voltage CTR can be switched in synchronism with the rotor-position detection signals S1-S6. In the example shown in FIG. 7, the level of the offset voltage is switched every two detection cycles. The timing of switching the level is determined by the detection level switching signal CK5 supplied to the offset level switching circuit 46.

Since in a first detection cycle one stator coil of one phase is switched on and off to have L level when it is switched on while two stator coils of other phases have H level in periods T1, T3, and T5, so that the detection reference voltage CTR becomes equal to ⅔ of the voltage VCC plus the offset voltage. In periods T2, T4, and T6, one stator coil of one phase is switched on and off to have H level when it is switched on while two stator coils of other phases are kept at L level. Accordingly, the detection reference voltage CTR becomes equal to ⅓ of the voltage VCC minus the offset voltage. That is, in synchronism with the period switching timing signal CK3, the current sources 35 and 36 are alternately switched over.

In the second detection cycle, the polarity of the offset voltage in the respective periods T1-T6 is reversed with respect to the first cycle. That is, the detection reference voltage CTR becomes ⅔ of the voltage VCC minus the offset voltage in periods T1, T3, and T5. The detection reference voltage CTR becomes ⅓ of the voltage VCC plus the offset voltage in periods T2, T4, and T6. That is, the current sources 35 and 36 are alternately switched over in synchronism with the period switching timing signal CK3, in the opposite manner with respect to the first detection cycle. The first and second detection cycles is discriminated and selected by the detection cycle signal CK4.

In the third detection cycle, the level of the offset voltage is switched by the detection level switching signal CK5. Subsequently, the detection reference voltage CTR is switched as in the first and second detection cycles.

The repetition of such detection cycle is preferably stopped at the stage where a detection pattern thus obtained matches one of the detection logic patterns. The repetition may be ended when detection cycles have been completed for all combinations of levels and directions of the offset voltage.

The register 25 stores the comparison outputs CTO received from the comparator 24 at the timing of the register instruction signal CK2. In synchronism with the detection cycle signal CK4, the register 25 outputs therefrom the stored comparison outputs CTO to the decoder 26 as a "detection patterns" R1-R6 at the end of each detection cycle.

The logic detection table 26A in the decoder 26 stores different detection logic patterns that are set to suit for different kinds of sensorless motors.

FIG. 8 shows, in a comprehensive form, a group of predetermined detection logic patterns stored in the logic detection table 26A. In the example shown in FIG. 8, four detection logic patterns 1-4 constitute a group of detection logic patterns. Pos.1-Pos.12 listed in each of the detection logic patterns 1-4 represent respective angular positions of the rotor obtained by equally dividing the electric angle of 360° by 12. As seen in FIG. 8, multiple detection logic patterns (four in the example shown herein) are set up for each of the angular positions of the rotor. Looking at the rotor Pos.1 for example, it is associated with detection patterns "LHHLLL", "LHHLLL", "HHHHLL", and "HHHHLL". Thus, since any detection pattern that matches any one of the four detection logic patterns 1-4 indicates the same the rotor position, Pos.1, the startup logic (Y1, Y2, and Y3) for the position is the same "H, L, M" as shown in FIG. 8, where "H, L, M" represents a condition that the U-phase stator coil has H level, V-phase stator coil has L level, and W-phase stator coil has an open state. Other startup logics Y1-Y3 are determined in the same way.

FIG. 9 shows a group of actual detection logic patterns. It is noted that, of the periods T1-T6 of each detection cycle, each of the voltage levels in periods T1, T3, and T5 is inverted with respect to the corresponding voltage level in the respective periods T2, T4 and T6. As a consequence, the levels of the comparison output CTO in periods T1, T3, T5 are inverted in periods T2, T4 and T6. Logic states for periods T1, T3, and T5 of FIG. 9 are inverted with respect to those of FIG. 8. That is, in periods T1, T3, and T5, H levels of FIG. 8 are inverted to L levels in FIG. 9 and L levels of FIG. 8 are inverted to H levels in FIG. 9.

The detection pattern comparison circuit 26B compares the detection pattern R1-R6 received from the register 25 with the group of detection logic patterns of listed in the logic detection table 26A. When a detection pattern R1-R6 matches any one detection logic pattern, P1 say, of the group, the detection pattern comparison circuit 26B outputs a pattern matching signal C1 along with the detection logic pattern P1.

The FF circuit 26C is set upon receipt of the pattern matching signal C1 and outputs a mode select signal SEL from its output terminal Q. This mode select signal SEL is inputted to the mode selector circuit 11, which causes the state of the mode selection circuit 11 to switch its output from rotor-position detection signals S1-S6 to drive signals MTX1-MTX6. Since this mode select signal SEL is outputted only after the rotor position is determined, operation of the rotor-position detection circuit 20 is preferably stopped by the mode select signal SEL.

The mode select signal SEL is further inputted to the logic conversion circuit 26D. Upon receipt of the signal, the logic conversion circuit 26D converts the detection logic pattern P1 to a proper startup logic Y1-Y3.

The preset circuit 27 supplies the startup logic Y1-Y3 received from the logic conversion circuit 26D to the drive-waveform generation circuit 14. Incidentally, when a preset signal PR is inputted to the preset circuit 27, the circuit outputs a predetermined startup logic Y1-Y3.

Figure 10:
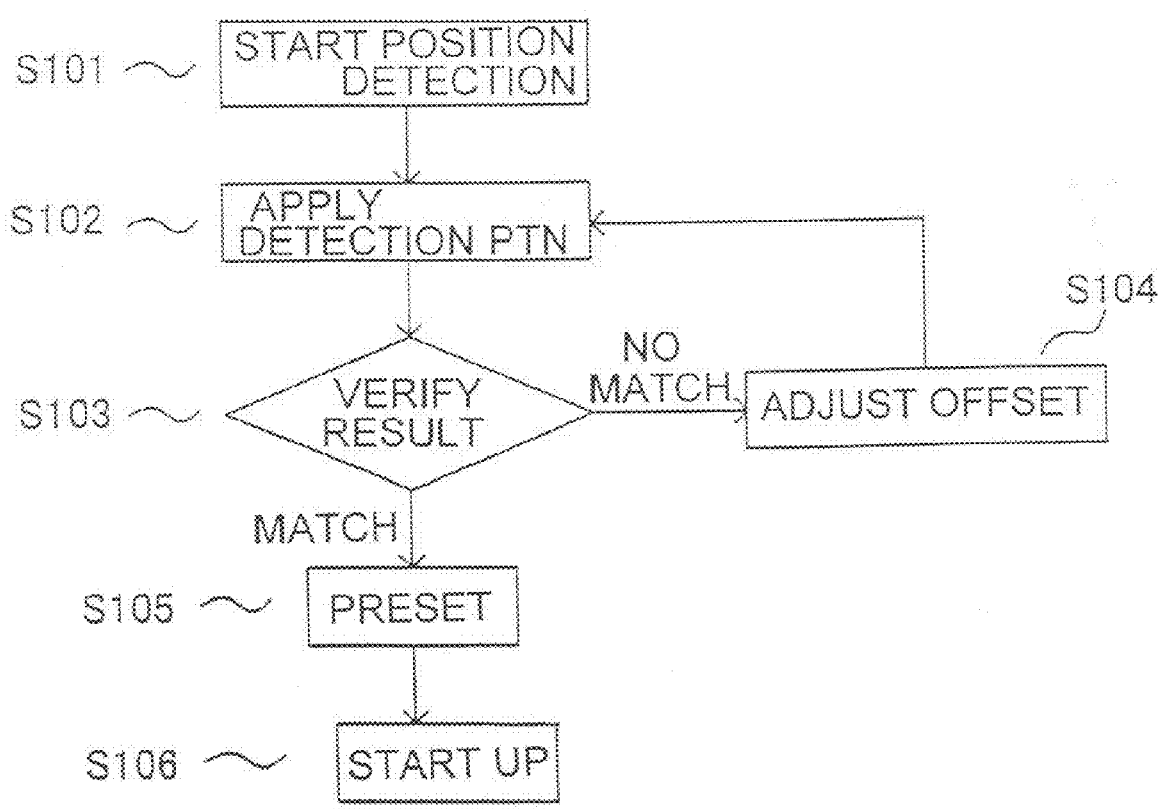
FIG. 10 is a flowchart illustrating a brief procedure to determine the position of a rotor.

Next, referring to the flow chart of FIG. 10, operation of the above described motor drive unit will be described.

As rotor position detection operation is started for the magnet rotor of a stationary sensorless motor 2 in step S101, a motor startup instruction signal ST is supplied to the rotor-position detection circuit 20.

Upon receipt of the motor startup-instructions signal ST, the clock generating circuit 21 starts its oscillation to generate the first through fifth clocks CK1-CK5 as shown in FIG. 2. In the first detection cycle shown in FIG. 2, rotor-position detection signals S1-S6 are supplied to the drive switch circuit 1 in each of periods T1-T6, which executes switching of the power transistors Q1-Q6. This in turn causes rotor-position detection drive voltages Vuout, Vvout, and Vwout as shown in FIG. 3 to be applied to the stator coils Lu, Lv, and Lw of the motor 2.

The applied rotor-position detection drive voltages Vuout, Vvout, and Vwout generate a middle point voltage CTM in accordance with the position of the rotor. On the other hand, in the first detection cycle, a detection reference voltage CTR is generated as shown in FIG. 7. The middle point voltage CTM and the detection reference voltage CTR are compared by the comparator 24 in each of periods T1-T6, and resultant comparison outputs CTO are sequentially stored in the register 25 at the timing of the register instruction signal CK2. Each piece of the comparison output CTO can be stored in the register 25 at any point of time in the respective periods T1-T6, preferably at a moment when the middle point voltage CTM is stable.

Upon completion of storage of the comparison outputs CTO for the first detection cycle, the register 25 supplies the outputs CTO for the first detection cycle, as a detection pattern R1-R6, to the detection pattern comparison circuit 26B of the decoder 26 in step S102.

The detection pattern R1-R6 is collated with the detection logic patterns listed in the logic detection table 26A by the detection pattern comparison circuit 26B in step S103 to see if the detection pattern R1-R6 matches any one of the detection logic patterns.

If in the collation the detection pattern R1-R6 does not match any of the detection logic patterns, no pattern matching signal C1 or no matching detection logic pattern P1 will be outputted. The procedure proceeds to the second detection cycle.

In the second detection cycle, the detection reference voltage CTR is varied from that of the first detection cycle in step S104. As an example of varying the detection reference voltage CTR, the polarity of the offset voltage can be reversed in each of periods T1 through T6, as shown in FIG. 7. In this case, the offset level need not be varied if its polarity is reversed. As another example, the offset level of the offset voltage may be varied without changing its polarity. That is, only the offset level needs to be varied.

Thus, in the second detection cycle, a detection pattern R1-R6 is obtained again (step S102) after the detection reference voltage CTR is varied, which pattern is collated in step S103.

If there is no match in the collation, the procedure proceeds to a third detection cycle to repeat steps S104, S102, and S103 in the same manner as described above. In this way, a detection cycle is repeated with a varied detection reference voltage CTR until a matching detection logic pattern is found. In this case, the offset level of the detection reference voltage CTR may be varied every two detection cycles, wherein the polarity of the offset voltage in the first (or odd-numbered) detection cycle is reversed with respective to the polarity of the offset voltage in the second (or even-numbered) detection cycle. In addition, the detection reference voltage CTR may be varied in such a way that the offset voltage increases or decreases in the sequence of detection cycles.

If, as a result of collation in step S103, the detection pattern R1-R6 matches any one detection logic pattern P1 of the detection logic patterns, a pattern matching signal C1 and the matching detection logic pattern P1 are outputted from the detection pattern comparison circuit 26B.

The FF circuit 26C is set by the pattern matching signal C1, and a mode select signal SEL is outputted therefrom. This mode select signal SEL switches the mode selection circuit 11 and causes the mode selection circuit 11 to output drive signals MTX1-MTX6 in place of the rotor-position detection signals S1-S6.

The matching detection logic pattern P1 is converted into a corresponding startup logic Y1-Y3 by the logic conversion circuit 26D. The startup logic Y1-Y3 is supplied to the drive-waveform generation circuit 14 via the preset circuit 27.

As described above, when the collation fails, the motor drive unit of the invention varies the level of the detection reference voltage CTR and repeats the rotor position detection procedure to generate a further rotor-position detection signal. The group of predetermined detection logic patterns is formed to multiply include different logic patterns for a given position of the rotor. Thus, the position of a stationary rotor of a motor can be correctly detected irrespective of the type of the motor used without adjusting the detection reference voltage. A certain type of power supply voltage VCC of an electric apparatus occasionally exhibits an excessive drop or rise. Nevertheless, the position of the rotor of a motor of such electric apparatus can be determined by the invention without failure even under such conditions. Thus, if an inventive motor drive unit is used, external adjustment of the detection reference voltage of the unit is not needed, so that various type of motors can be started up in a stable manner without being affected by the power supply voltage.

It is noted that each detection cycle is done in a few milliseconds (e.g. about 5 milliseconds) so that the rotor position can be detected within practically no time if a few detection cycles are repeated.

Incidentally, the decoder 26 can be configured to output a matching detection logic pattern P1 only when a detection pattern matches a predetermined detection logic pattern, and convert the matching logic pattern P1 to a startup logic when a mode select signal SEL is outputted while outputting a detection pattern R1-R6 in each detection cycle.

The rotor-position detection circuit 20 is preferably stopped to cut down wasteful power consumption when a mode select signal SEL is outputted.

In the motor drive unit of the invention, a detection cycle is repeated with a varied detection reference voltage, so that a matching logic pattern is eventually obtained in some detection cycle. However, should no matching logic pattern is obtained for some reason in a predetermined number of detection cycles, the motor can be forcibly started by providing the preset circuit 27 with a preset signal PR to furnish a predetermined startup logics Y1-Y3 to the motor.

It should be appreciated that, in an MD drive and an HDD drive utilizing an inventive motor drive unit, its motor, e.g. spindle motor, will never be started up in the wrong direction, thereby starting in the correct direction quickly and smoothly. Although it is shown and described in the foregoing example that the drive switch circuit 1 and the motor drive control circuit 3 are separate components, they can be formed together in one IC.

INDUSTRIAL APPLICABILITY

A motor drive unit in accordance with the invention can: correctly detect the position of the stationary rotor of any type of sensorless motor used in for example, an MD drive and an HDD drive; determine a proper startup logic therefor; and start up the motor in a stable condition.

The invention claimed is:

1. A motor drive unit for driving a sensorless motor having a multiplicity of stator coils and a drive switching circuit for supplying drive current to said stator coils, said motor drive unit adapted to control the drive switching circuit by a drive signal, said drive unit comprising:
   a sequence circuit for providing said drive switching circuit with a rotor-position detecting signal for controlling said drive switching circuit such that, prior to starting up said sensorless motor, said multiple stator coils are supplied with rotor position detecting drive voltages that vary the middle point voltage of the respective stator coils but will not rotate said sensorless motor; and
   a matching-pattern detection circuit adapted to compare said middle point voltage of said multiple stator coils obtained under said applied rotor-position detection drive voltages with the detection reference voltage established on the basis of said rotor-position detection drive voltages, and determine whether or not the result of said comparison matches any one of predetermined detection logic patterns, wherein
   when they do match in said comparison, said motor drive unit generates a startup logic in accord with the rotor position specified by the matching detection logic pattern, but
   when they do not match in said comparison, said motor drive unit varies the detection reference voltage and causes said sequence circuit to generate a further rotor-position detecting signal to repeat detection of said rotor position.

2. The motor drive unit in accordance with claim 1, wherein said rotor position detecting voltages are generated so as to create in sequence two states such that, in one state, a stator coil of one arbitrary phase is switched on and off to have a low potential when it is switched on while other stator coils of other phases have a high potential, and, in another state, a stator coil of another arbitrary phase is switched on and off to have a high potential when it is switched on while other stator coils of other phases have a low potential, said sequence repeated allowing one arbitrary phase shifting from one stator coil to another.

3. The motor drive unit in accordance with claim 1, wherein said predetermined detection logic patterns multiply include different detection logic patterns for a given rotor position.

4. The motor drive unit in accordance with claim 1, wherein said matching-pattern detection circuit has a detection-level generation circuit for adding to a variable offset voltage a virtually neutral point voltage that is formed based on the rotor position detecting drive voltages supplied to said multiple stator coils, to thereby obtain said detection reference voltage.

5. The motor drive unit in accordance with claim 4, wherein said virtually neutral point voltage is formed by a resistor circuit consisting of a multiplicity of resistors each having one end coupled to the rotor position detection drive voltage the other end connected to a common node.

6. The motor drive unit in accordance with claim 4, wherein said offset voltage is switchable in level and/or polarity by an offset switching signal.

7. The motor drive unit in accordance with claim 1, wherein said matching-pattern detection circuit includes:
   a comparator for comparing said middle point voltage with said detection reference voltage;
   a register for storing as detected patterns results of said comparison received in sequence from said comparator; and
   a decoder for comparing said detection patterns stored in said register with said predetermined detection logic patterns and for outputting either said startup logic or a mode selection signal instructing detection of the position of said rotor or driving of said motor, in accordance with the result of the comparison.

8. An electric apparatus, comprising:
   a sensorless motor;
   a motor drive unit for driving said sensorless motor in accordance with claim 1.

* * * * *